United States Patent
Akieda et al.

(10) Patent No.: US 9,690,059 B2
(45) Date of Patent: Jun. 27, 2017

(54) OPTICAL MODULE

(71) Applicant: FUJITSU COMPONENT LIMITED, Tokyo (JP)

(72) Inventors: Shinichiro Akieda, Tokyo (JP); Osamu Daikuhara, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 0 days.

(21) Appl. No.: 15/185,275

(22) Filed: Jun. 17, 2016

(65) Prior Publication Data

US 2017/0003464 A1 Jan. 5, 2017

(30) Foreign Application Priority Data

Jun. 30, 2015 (JP) ................. 2015-131589

(51) Int. Cl.
*G02B 6/42* (2006.01)
*G02B 6/38* (2006.01)

(52) U.S. Cl.
CPC ......... *G02B 6/4245* (2013.01); *G02B 6/3853* (2013.01); *G02B 6/428* (2013.01); *G02B 6/4246* (2013.01); *G02B 6/4261* (2013.01); *G02B 6/4281* (2013.01); *G02B 6/4284* (2013.01); *G02B 6/4292* (2013.01); *G02B 6/3885* (2013.01); *G02B 6/3887* (2013.01); *G02B 6/421* (2013.01)

(58) Field of Classification Search
CPC ..... G02B 6/4245; G02B 6/428; G02B 6/4261
See application file for complete search history.

(56) References Cited

U.S. PATENT DOCUMENTS

| 9,291,785 B2* | 3/2016 | Moriyama | ........... G02B 6/4292 |
| 9,497,878 B2* | 11/2016 | Huang | ................. H05K 7/1417 |
| 2015/0309269 A1* | 10/2015 | Daikuhara | ........... G02B 6/4281 385/14 |

FOREIGN PATENT DOCUMENTS

JP 2015-023143 2/2015

* cited by examiner

*Primary Examiner* — Omar R Rojas
(74) *Attorney, Agent, or Firm* — IPUSA, PLLC (57) ABSTRACT

An optical module includes a first ferrule, a second ferrule, a clip for holding the first ferrule and the second ferrule together, a board including a light-emitting element and a light-receiving element, an optical waveguide connecting the board to the first ferrule, an outer case forming a housing of the optical module and including a protrusion, and an inner case disposed in the outer case and to which the clip is attached. A pressing surface is formed at an end of the inner case. A first end of the board is in contact with the protrusion and a second end of the board is in contact with the pressing surface such that the board is clamped between the protrusion and the pressing surface.

5 Claims, 15 Drawing Sheets

OPTICAL MODULE

CROSS-REFERENCE TO RELATED APPLICATION

The present application is based upon and claims the benefit of priority of Japanese Patent Application No. 2015-131589, filed on Jun. 30, 2015, the entire contents of which are incorporated herein by reference.

BACKGROUND OF THE INVENTION

1. Field of the Invention

An aspect of this disclosure relates to an optical module.

2. Description of the Related Art

Electric cables made of, for example, copper have been used for communications of supercomputers and high-end servers via high-speed interfaces. However, optical communication is becoming popular to achieve high-speed signal transmission and to increase the transmission distance.

Next generation interfaces being discussed in standards such as InfiniBand Trade Association Enhanced Data Rate (IBTA EDR (registered trademark)) and 100G Ethernet (registered trademark) have a long transmission distance of tens of meters, and optical communication technologies with optical modules for converting an electric signal to an optical signal are used. For example, an optical module that converts an optical signal into an electric signal and outputs to the server, and converts an electric signal from the server into an optical signal and outputs to the optical cable is used to connect an optical cable and a server.

An optical module may include a light emitter, a light receiver, a driver for driving the emitter, and a trans-impedance amplifier (TIA) for converting an electric current into a voltage (see, for example, Japanese Laid-Open Patent Publication No. 2015-023143). The emitter, the receiver, the driver, and the TIA are mounted on a circuit board in the housing. The emitter and the receiver are connected to a ferrule via a flexible, sheet-shaped optical waveguide.

The circuit board may be misaligned in the housing due to its tolerance in size. This misalignment may cause the optical waveguide, which connects the emitter and the receiver to the ferrule, to warp, and the warp may cause light loss and cause a problem in optical transmission.

For the above reason, there is a demand for a highly-reliable, high-yield optical module whose circuit board can be firmly fixed to a housing at a desired position so as not to cause an optical waveguide to warp.

SUMMARY OF THE INVENTION

In an aspect of this disclosure, there is provided an optical module that includes a first ferrule, a second ferrule, a clip for holding the first ferrule and the second ferrule together, a board including a light-emitting element and a light-receiving element, an optical waveguide connecting the board to the first ferrule, an outer case forming a housing of the optical module and including a protrusion, and an inner case disposed in the outer case and to which the clip is attached. A pressing surface is formed at an end of the inner case. A first end of the board is in contact with the protrusion and a second end of the board is in contact with the pressing surface such that the board is clamped between the protrusion and the pressing surface.

DESCRIPTION OF EMBODIMENTS

Embodiments of the present invention are described below with reference to the accompanying drawings. In the descriptions below, the same reference number is assigned to the same components, and repeated descriptions of those components are omitted.

Figure 1A:
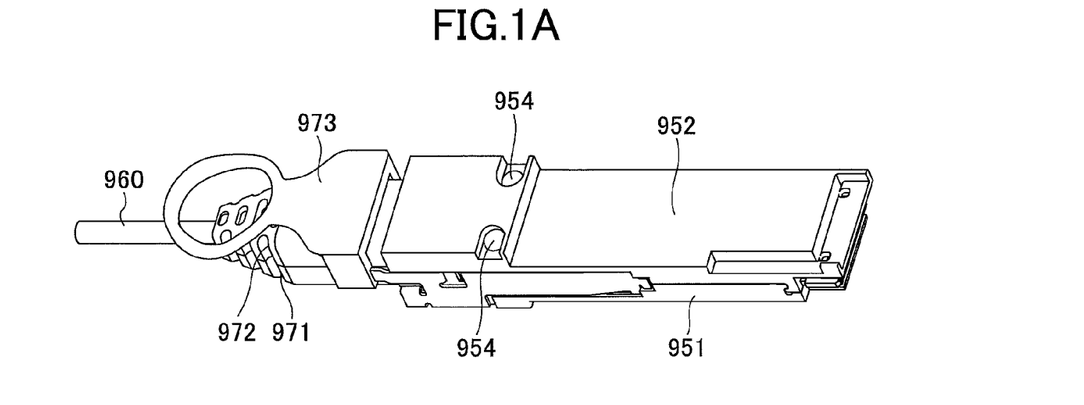
FIGS. 1A through 1C are drawings illustrating an exemplary optical module.
Figure 1B:
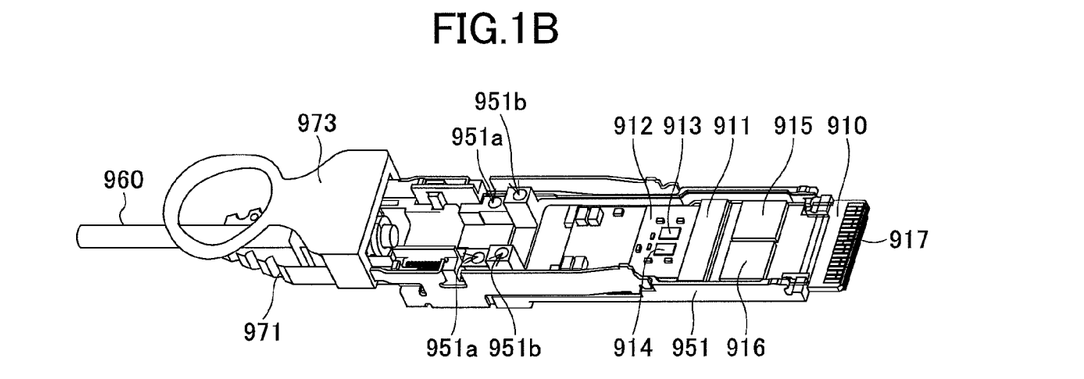
Figure 1C:
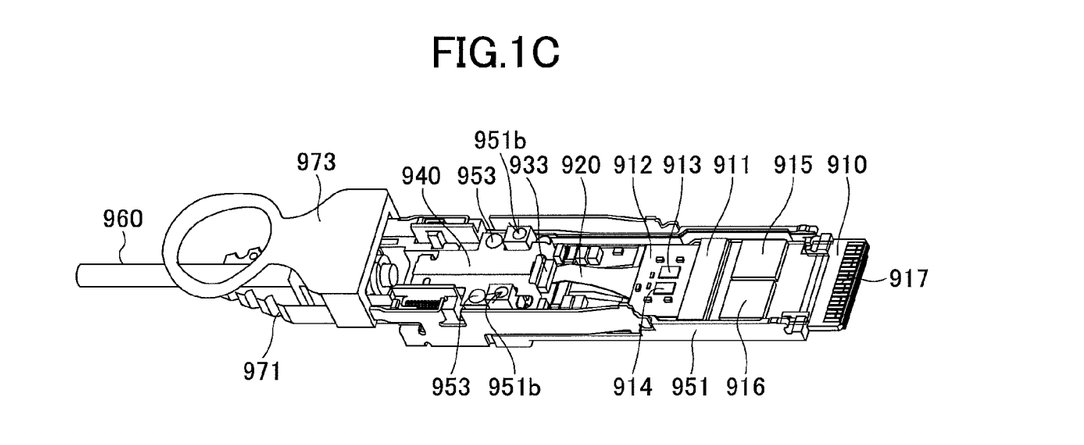
Figure 2:
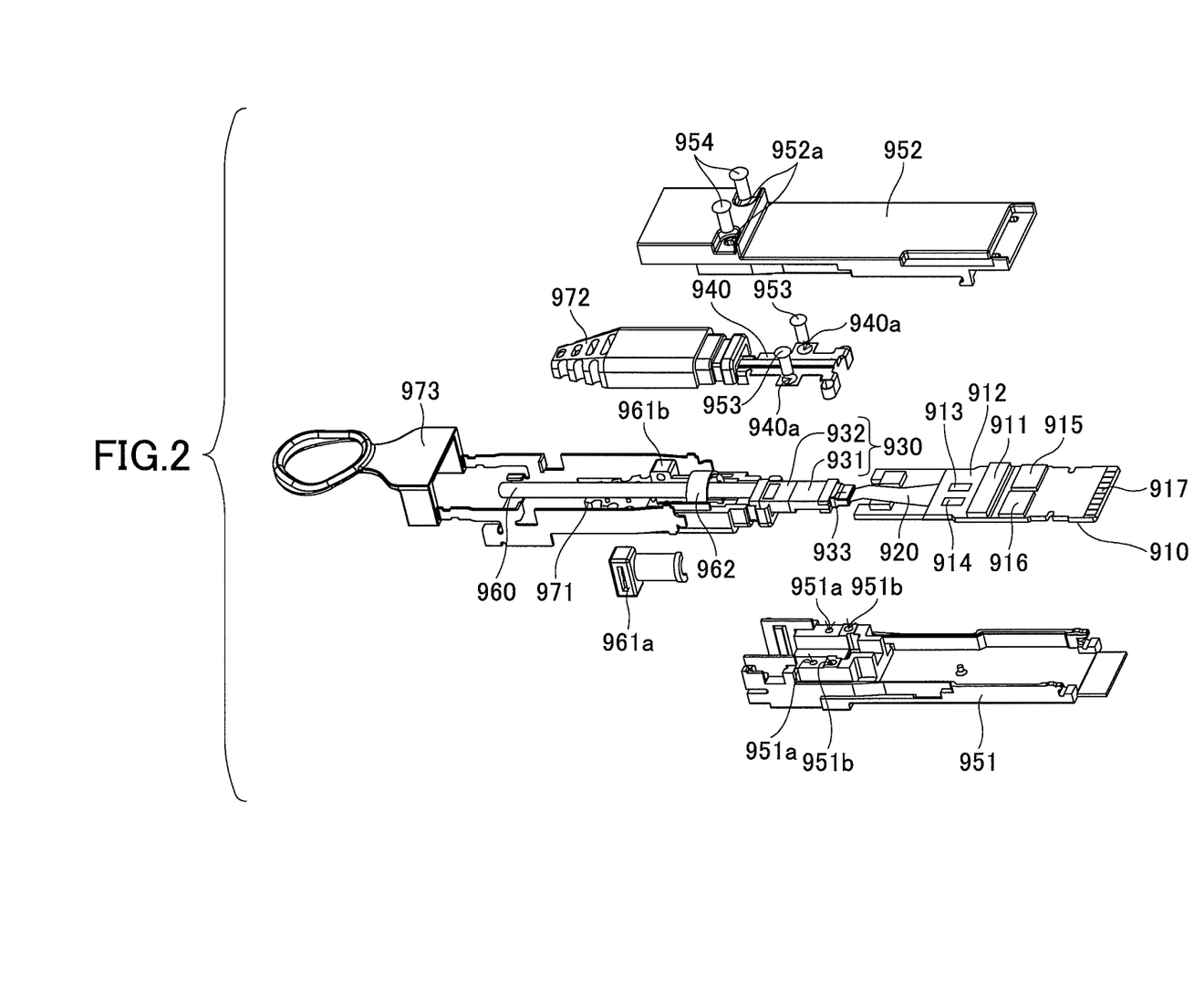
FIG. 2 is an exploded perspective view of an exemplary optical module.

First, an exemplary optical module is described with reference to FIGS. 1A through 2. FIG. 1A is an external perspective view of the optical module. FIG. 1B is an internal perspective view of the optical module where a board 910 is placed. FIG. 1C is an internal perspective view of the optical module where the board 910, an optical waveguide 920, a ferrule 930, and a clip 940 are placed. FIG. 2 is an exploded perspective view of the optical module.

The printed-circuit board ("board") 910, the optical waveguide ("waveguide") 920, the ferrule 930, and the clip 940 are housed in a housing formed by the lower outer case 951 and an upper outer case 952. An optical cable ("cable") 960 is connected to the optical module.

The board 910 includes a flexible printed circuit (FPC) connector 911 to which an FPC 912 is connected. The FPC 912 includes a light-emitting element ("emitter") 913 for converting an electric signal into an optical signal and a light-receiving element ("receiver") 914 for converting an optical signal into an electric signal. The board 910 also includes a driver 915 for driving the emitter 913, a trans-impedance amplifier (TIA) 916 for converting an electric current output from the receiver 914 into a voltage, and a terminal 917 for connecting the optical module to an external apparatus. The board 910 is placed in the lower outer case 951.

The waveguide 920 is a flexible, sheet-shaped waveguide, with one end is connected to the FPC 912.

The ferrule 930 includes a lens ferrule 931 and a mechanically transferable (MT) ferrule 932. The lens ferrule 931 and the MT ferrule 932 are connected to each other and are held together by the clip 940.

Another end of the waveguide 920 is connected to the lens ferrule 931, and the junction between the waveguide 920 and the lens ferrule 931 is protected by a ferrule boot 933. The ferrule 930 is placed in the lower outer case 951. The clip 940 with two screw holes 940a is fixed to the lower outer case 951 by aligning the screw holes 940a with screw holes 951a of the lower outer case 951 and screwing screws 953 into the aligned screw holes. As a result, the ferrule 930 is fixed to the lower outer case 951.

Sleeves 961a and 961b are fixed to the cable 960 by a crimp ring 962. A portion of the cable 960 is covered by cable boots 971 and 972, and a pull-tab/latch part 973 is attached to the cable boots 971 and 972.

With the ferrule 930 and the board 910 are placed in the lower outer case 951, the upper outer case 952 is placed on and fixed to the lower outer case 951 by screwing screws 954 into screw holes 952a formed in the upper outer case 952 and screw holes 951b formed in the lower outer case 951.

Figure 3A:
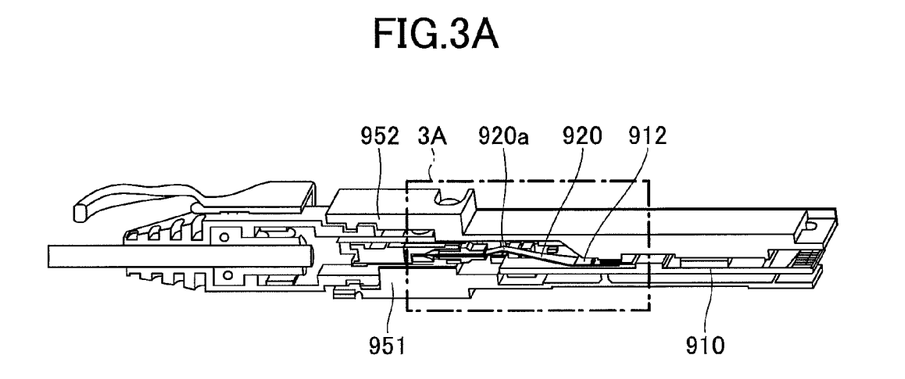
FIGS. 3A and 3B are drawings illustrating an optical waveguide of an optical module.
Figure 3B:
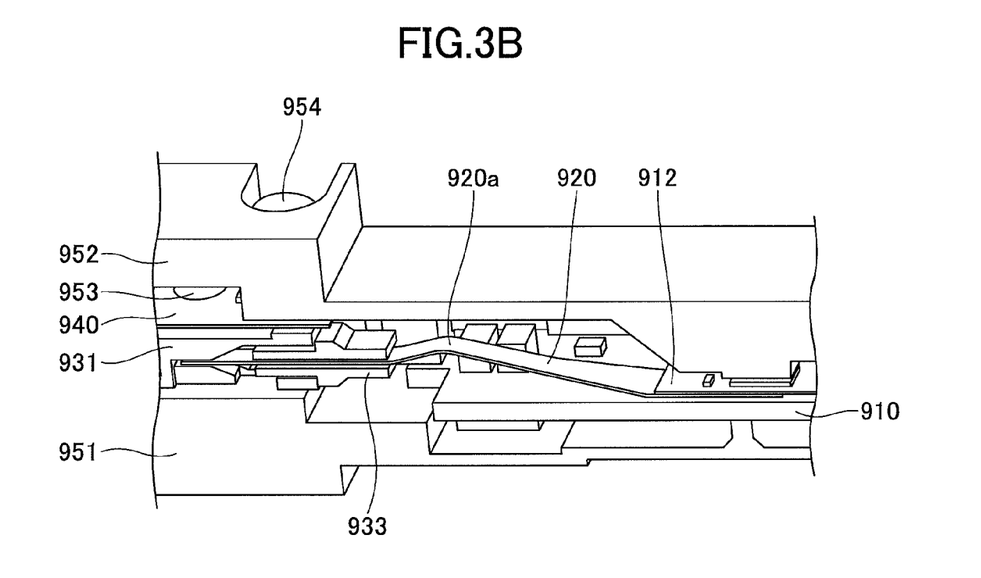

The size of each component of the optical module illustrated by FIGS. 1A through 2 may vary within its tolerance. For this reason, the board 910 may be misaligned in the lower outer case 951 when manufacturing the optical module. If the board 910 is fixed to the lower outer case 951 at a misaligned position, the waveguide 920 may warp and form a sharply bent portion 920a as illustrated in FIGS. 3A and 3B. FIG. 3A is a cut-away side view of the optical module, and FIG. 3B is an enlarged view of a portion of the optical module surrounded by a dashed-dotted line 3A in FIG. 3A.

At the bent portion 920a, some of the components of light propagating through cores of the waveguide 920 are not totally reflected at the core-cladding interface and leak out of the waveguide 920. A portion of the propagating light leaking out of the waveguide 920 may be lost. Also, the core and the cladding of the bent portion 920a tend to degrade, break, and cause a trouble during long-term use.

Thus, a warp in the waveguide 920 causes light loss, reduces the reliability of the optical module, and prevents normal optical communications. This in turn reduces the yield in manufacturing optical modules.

First Embodiment

Figure 4:
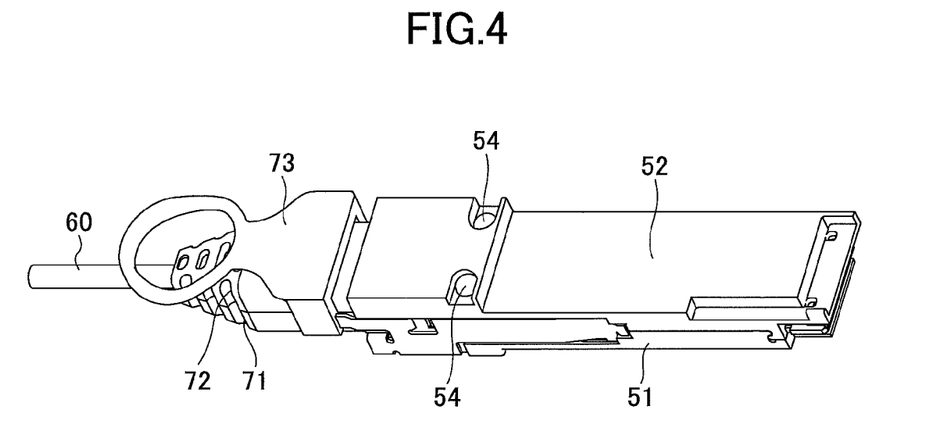
FIG. 4 is an external perspective view of an optical module of a first embodiment.

Next, an optical module according to a first embodiment is described with reference to FIGS. 4 and 5. FIG. 4 is an external perspective view of the optical module of the first embodiment.

The optical module of the first embodiment includes a printed-circuit board ("board") 10, an optical waveguide ("waveguide") 20, a ferrule 30, a clip 40, and an inner case 80 that are housed in a housing formed by a lower outer case 51 and an upper outer case 52. An optical cable ("cable") 60 is connected to the optical module.

Figure 5:
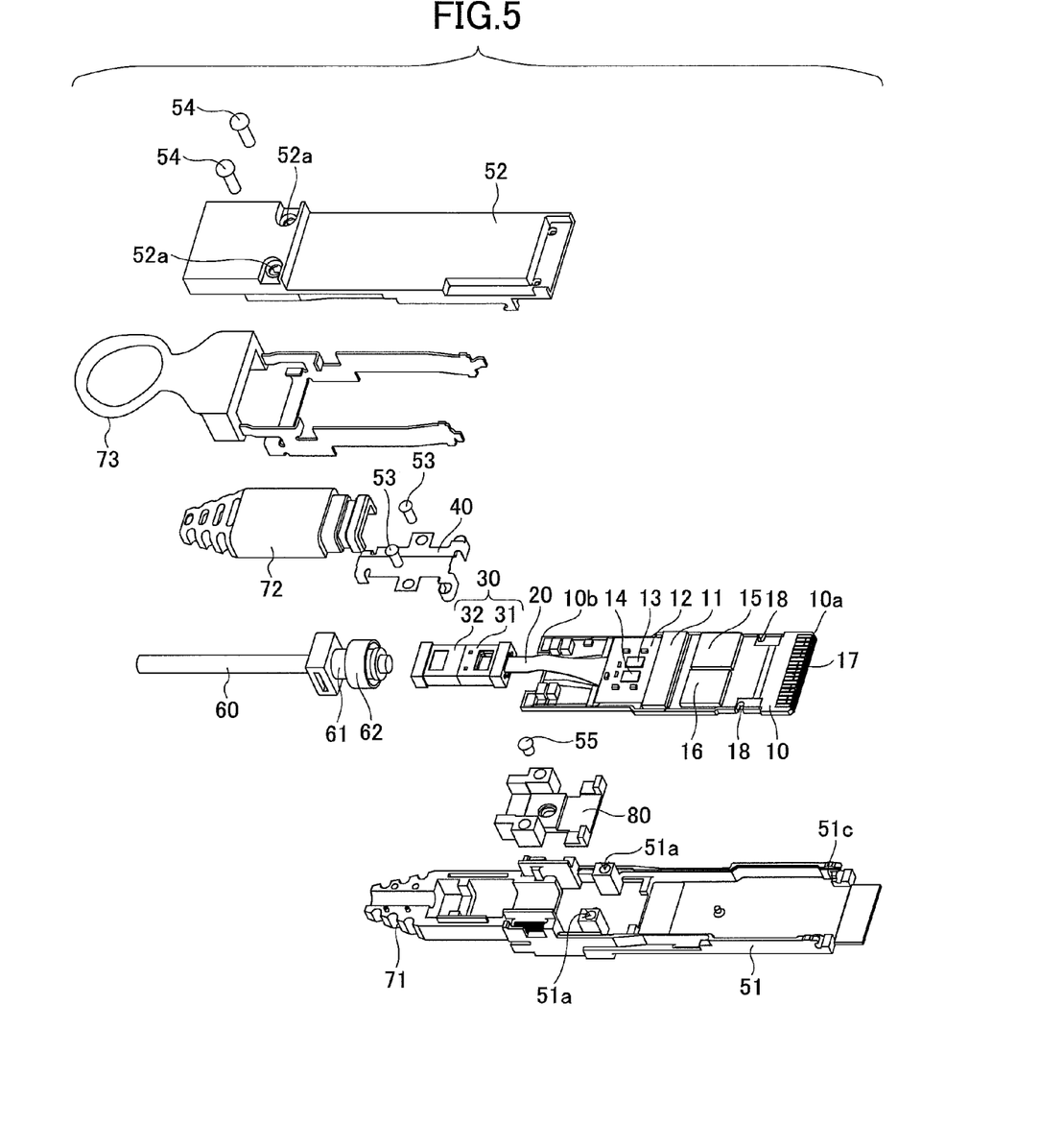
FIG. 5 is an exploded perspective view of an optical module of the first embodiment.

As illustrated in FIG. 5, the board 10 includes an FPC connector 11 to which an FPC 12 is connected. A light-emitting element ("emitter") 13 such as a VCSEL, and a light-receiving element ("receiver") 14 such as a photodiode are mounted on the FPC 12. The board 10 also includes a driver 15, a TIA 16, and a terminal 17 for connecting the optical module to an external apparatus.

One end of the waveguide 20 is connected to the FPC 12, and the other end is connected to a lens ferrule 31. The junction between the waveguide 20 and the lens ferrule 31 is protected by a ferrule boot.

The ferrule 30 includes the lens ferrule 31 and an MT ferrule 32. The lens ferrule 31 and the MT ferrule 32 are connected to each other and are held together by the clip 40. The ferrule 30 indicates the combination of the lens ferrule 31 and the MT ferrule 32 held together by the clip 40. The MT ferrule 32 can collectively connect, for example, a multicore optical fiber. The lens ferrule 31 is a high-density ferrule corresponding to the MT ferrule 32. For example, a quad small form-factor pluggable (QSFP) optical connector includes the MT ferrule 32 and the lens ferrule 31 that are butted against each other to connect the cable 60 connected to the MT ferrule 32 to the waveguide 20 connected to the lens ferrule 31.

The inner case 80 into which the ferrule 30 is placed is placed inside of the lower outer case 51.

A sleeve 61 is fixed to the cable 60 by a crimp ring 62 at a position near the end of the cable 60 connected to the MT ferrule 32. A portion of the cable 60 to which the sleeve 61 is attached is covered by cable boots 71 and 72, and a pull-tab/latch 73 is attached to the cable boots 71 and 72.

Figure 6A:
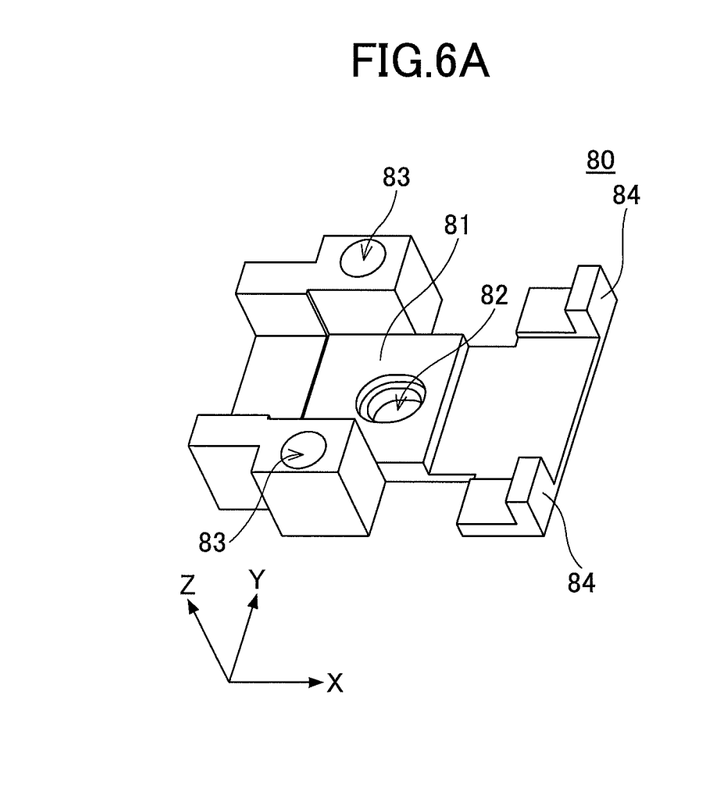
FIGS. 6A and 6B are perspective views of an inner case.
Figure 6B:
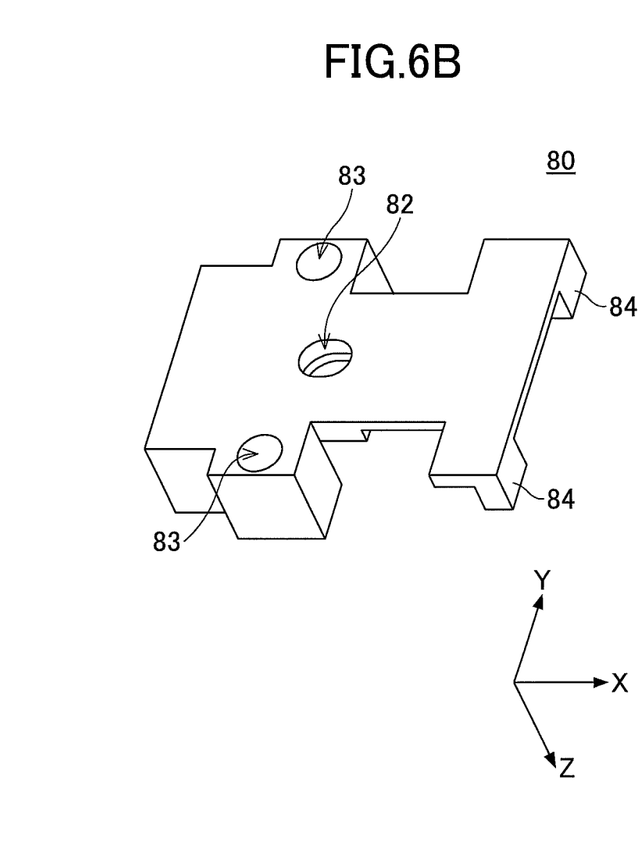
Figure 7A:
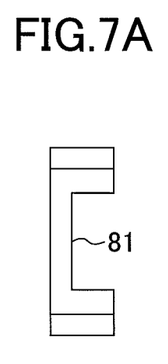
FIGS. 7A through 7F are various views of an inner case.
Figure 7B:
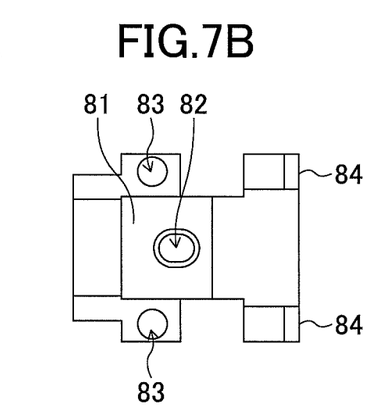
Figure 7C:
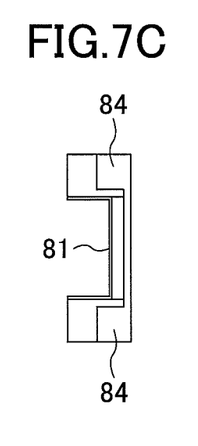
Figure 7D:
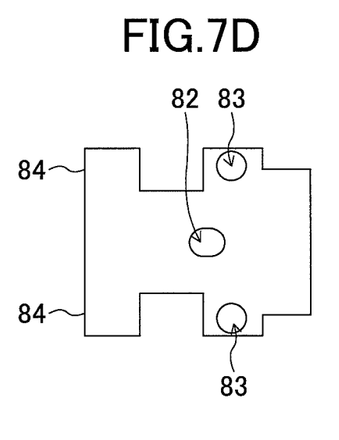
Figure 7E:
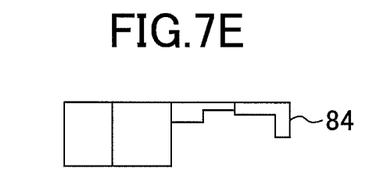
Figure 7F:
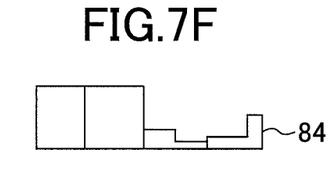

As illustrated by FIGS. 6A through 7F, a recess for housing the ferrule 30 is formed in the inner case 80. An oval screw hole 82 that passes through the inner case 80 and is long in the X-axis direction is formed in a bottom surface 81 of the recess. Two screw holes 83 are formed in opposite sides of the inner case 80 in the Y-axis direction. Pressing surfaces 84 are formed on parts of the inner case 80 that are disposed at an end of the inner case 80 in the X-axis direction and at opposite sides in the Y-axis direction. FIGS. 6A and 6B are perspective views of the inner case 80. FIG. 7A is a front view, FIG. 7B is a top view, FIG. 7C is a rear view, FIG. 7D is a bottom view, FIG. 7E is a left-side view and FIG. 7F is a right-side view of the inner case 80.

In the present embodiment, the inner case 80 may be formed of a resin such as poly butylene terephthalate (PBT), acrylonitrile butadiene styrene (ABS), or poly oxy methylene (POM); a metal such as an aluminum alloy, a zinc alloy, or stainless steel; or an elastic material such as elastomer or rubber. In terms of costs, the inner case 80 is preferably formed of a resin.

Figure 8A:
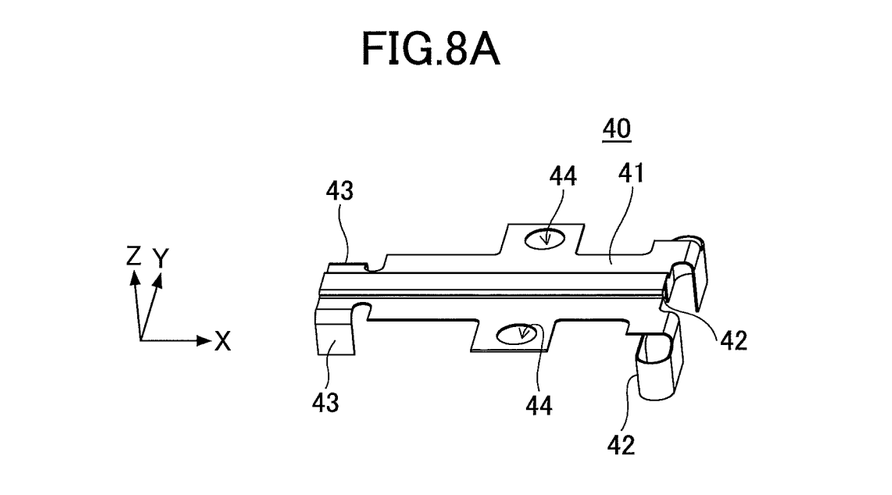
FIGS. 8A and 8B are perspective views of a clip.
Figure 8B:
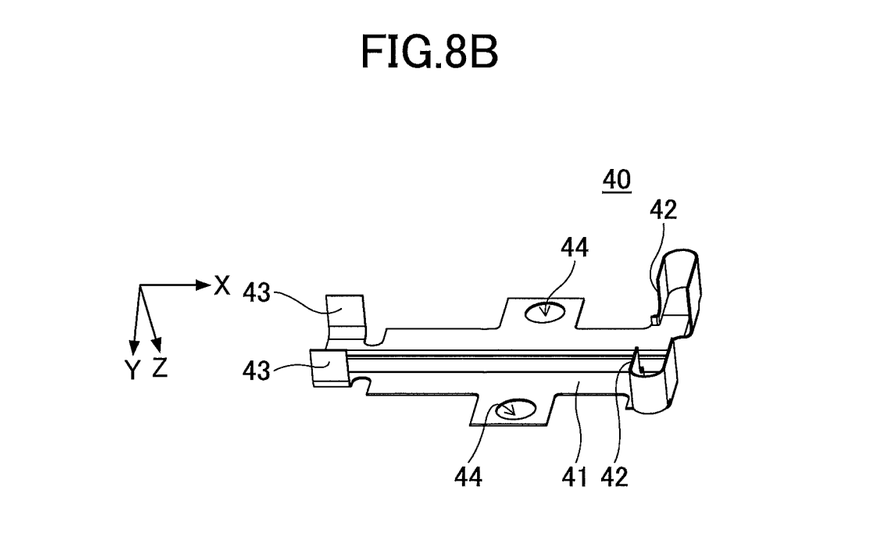

As illustrated by FIGS. 8A and 8B, the clip 40 is formed by folding, for example, an elastic metal plate. The clip 40 includes a base 41 that is long in the X-axis direction, two springs 42 formed at one end of the base 41 in the X-axis direction and disposed on opposite sides in the Y-axis direction, two engaging parts 43 formed at the other end of the base 41 in the X-axis direction and disposed on opposite sides in the Y-axis direction, and two screw holes 44 formed in the base 41 and disposed on opposite sides of the base 41 in the Y-axis direction. FIGS. 8A and 8B are perspective views of the clip 40.

Next, an exemplary method of producing the optical module is described. The optical module is produced by assembling the components illustrated in FIG. 5.

Figure 9:
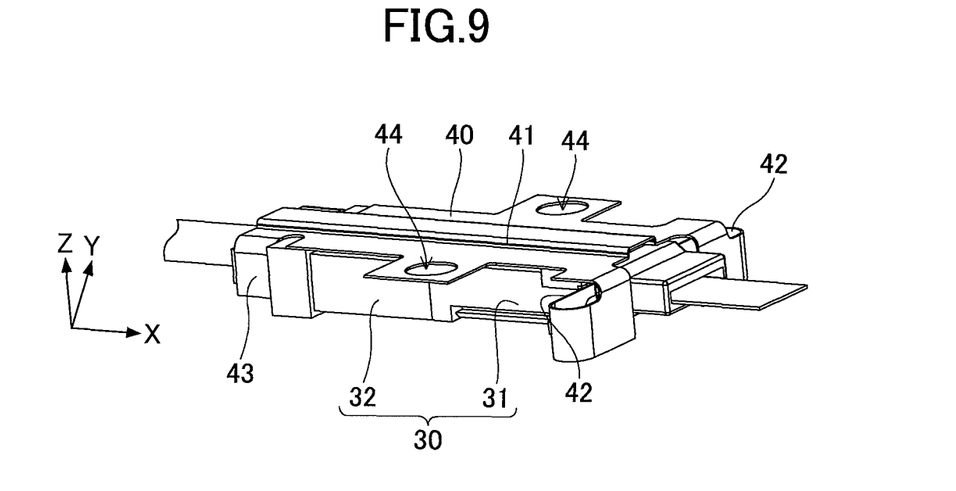
FIG. 9 is a drawing illustrating a lens ferrule and an MT ferrule held together by a clip.

First, as illustrated by FIG. 9, the lens ferrule 31 and the MT ferrule 32 are held together by the clip 40. The lens ferrule 31 and the MT ferrule 32 are connected to each other, then the clip 40 is fitted onto the connected lens ferrule 31 and MT ferrule 32 such that an end of the MT ferrule 32 engages with the engaging parts 43 and an end of the lens ferrule 31 is pressed by the springs 42. The restoring force of the springs 42 acts toward the engaging part 43 when the clip 40 is fitted onto the ferrule 30. Accordingly, the lens ferrule 31 and the MT ferrule 32 are clamped between the engaging parts 43 and the springs 42, and are thereby held together.

Figure 10A:
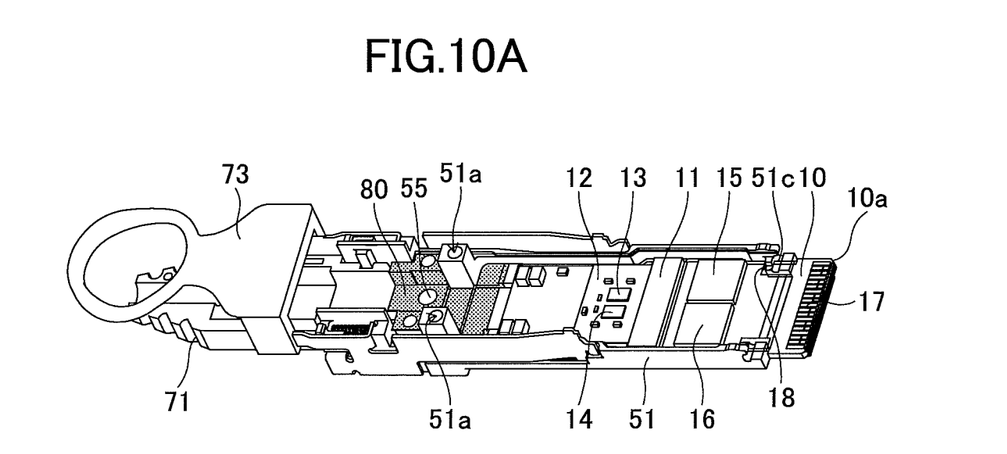
FIGS. 10A and 10B are drawings illustrating a lower outer case in which an inner case is placed.
Figure 10B:
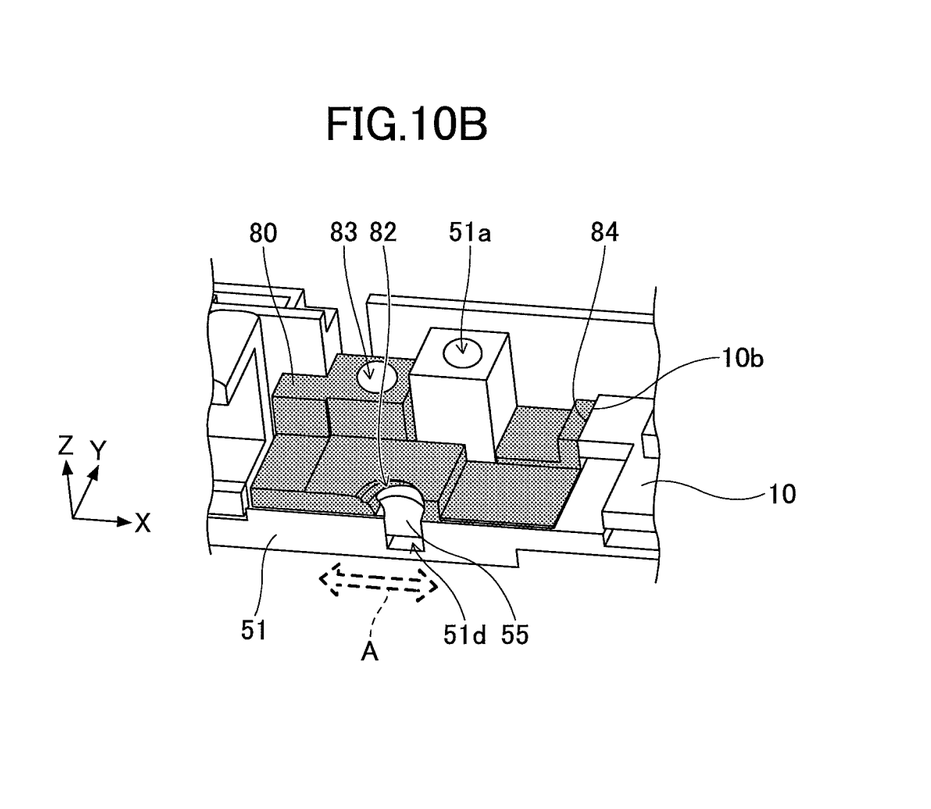

Next, as illustrated by FIGS. 10A and 10B, the board 10 and the inner case 80 are placed in the lower outer case 51. FIG. 10A is a drawing illustrating the lower outer case 51 in which the board 10 and the inner case 80 are placed. FIG. 10B is an enlarged view of a part of FIG. 10A. In FIGS. 10A and 10B, the waveguide 20 is omitted. Referring to FIG. 5, notches 18 are formed in opposite sides of the board 10 near an end 10a of the board 10, and protrusions 51c that engage with the notches 18 are formed in the lower outer case 51.

The inner case 80 is attached to the lower outer case 51 to which the board 10 is placed. As illustrated in FIG. 10B, the screw hole 82 is aligned with a screw hole 51d formed in the lower outer case 51, and the inner case 80 is attached to the lower outer case 51 by screwing a screw 55 into the aligned screw holes. Because the screw hole 82 has an oval shape that is long in the X-axis direction, the inner case 80 can be moved in the X-axis direction (arrow A) in FIG. 10B to adjust the position of the inner case 80 even after the screw 55 is inserted in the screw hole 82.

When the inner case 80 is moved toward the board 10 with the screw 55 inserted in the screw hole 82, the pressing surfaces 84 contact an end 10b of the board 10 and press the board 10, and the notches 18 engage with the protrusions 51c. With the notches 18 engaging with the protrusions 51c and the end 10b being in contact with the pressing surfaces 84, the board 10 is held between the inner case 80 and the lower outer case 51. In this state, the inner case 80 is fixed to the lower outer case 51 with the screw 55. As a result, the board 10 is held in position by the inner case 80 and the lower outer case 51, and the misalignment of the board 10 is prevented.

Figure 11A:
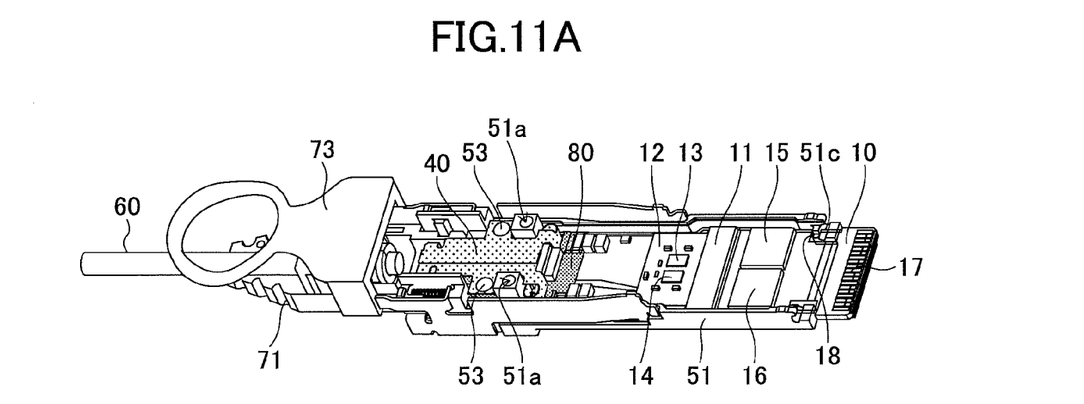
FIGS. 11A and 11B are drawings illustrating a lower outer case in which a clip is attached to an inner case.
Figure 11B:
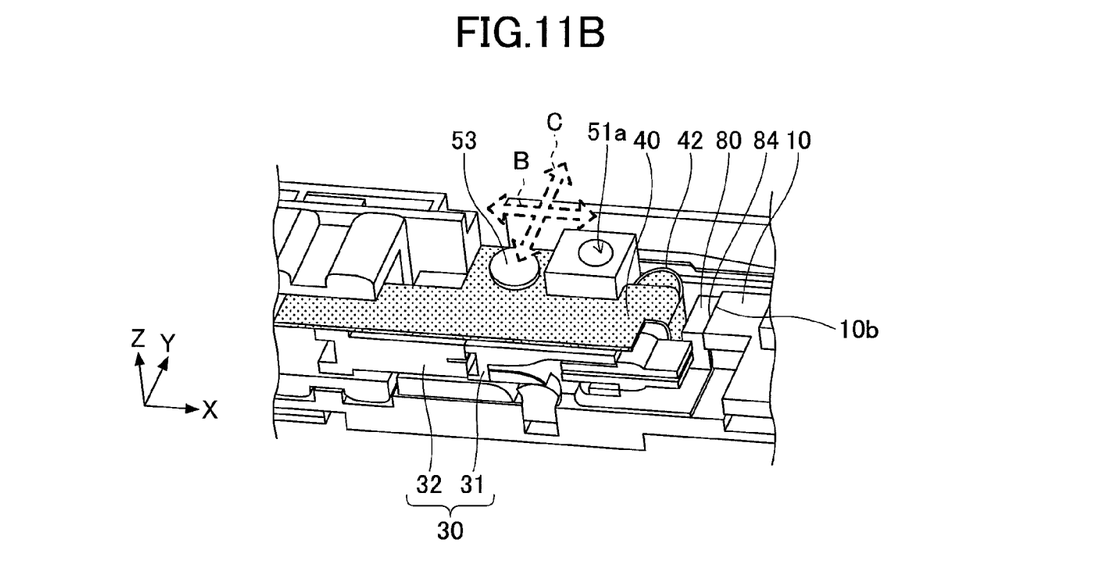

Next, as illustrated by FIGS. 11A and 11B, the clip 40 to which the ferrule 30 is attached is attached to the inner case 80 attached to the lower outer case 51. FIG. 11A is a drawing illustrating the lower outer case 51 in which the clip 40 is attached to the inner case 80, and FIG. 11B is an enlarged view of a part of FIG. 11A. In FIGS. 11A and 11B, the waveguide 20 is omitted.

The screw holes 83 are aligned with the screw holes 44, and screws 53 are screwed into the aligned screw holes. The screw holes 44 have a diameter that is greater than the diameter of the screws 53. Accordingly, the clip 40 can be moved in the X-axis direction (arrow B) and the Y-axis direction (arrow C) in FIG. 11B to adjust the position of the clip 40 even after the screws 53 are inserted into the screw holes 44.

Accordingly, the position of the ferrule 30 is adjusted by moving the clip 40 while the screws 53 are inserted into the screw holes 44. After the position of the ferrule 30 is adjusted, the clip 40 is screwed to the inner case 80 with the screws 53 to fix the ferrule 30 at the position. Because the ferrule 30 is fixed to the clip 40, the ferrule 30 is fixed to the inner case 80 by screwing the clip 40 to the inner case 80.

The upper outer case 52 is placed on the lower outer case 51 into which the board 10, the inner case 80, and the ferrule 30 are placed. Then, two screw holes 52a of the upper outer case 52 are aligned with two screw holes 51a of the lower outer case 51, and the upper outer case 52 is fixed to the lower outer case 51 by screwing screws 54 into the aligned screw holes.

Second Embodiment

Next, a second embodiment is described. In the second embodiment, pressing surfaces of an inner case are inclined or curved.

Figure 12A:
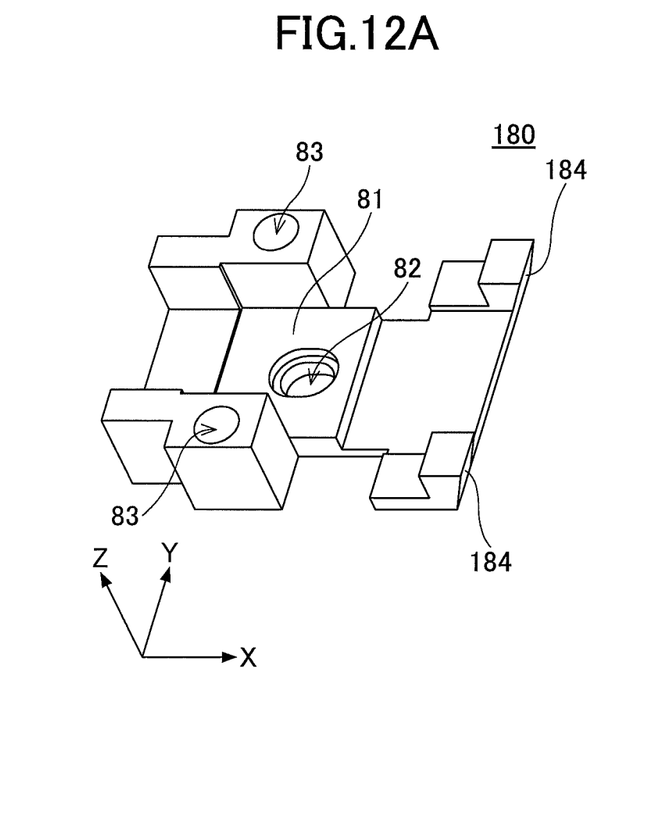
FIGS. 12A and 12B are perspective views of an inner case according to a second embodiment.
Figure 12B:
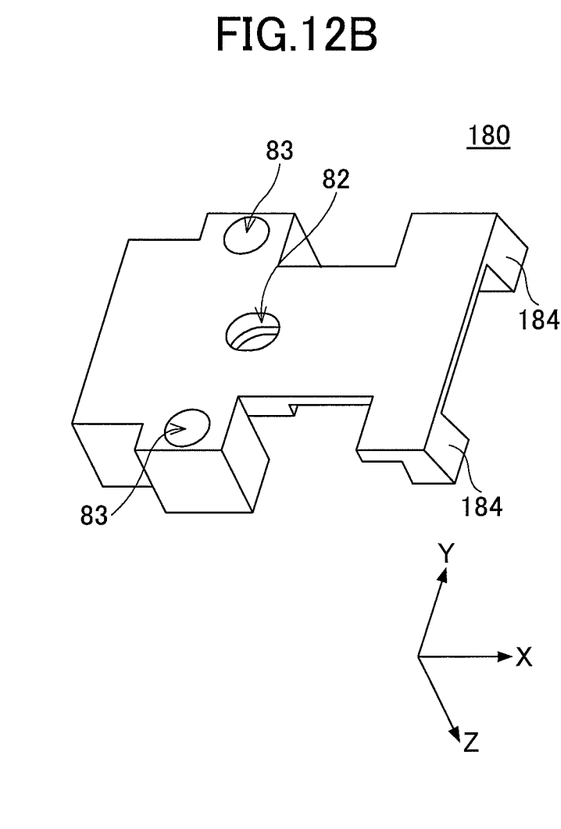
Figure 13:
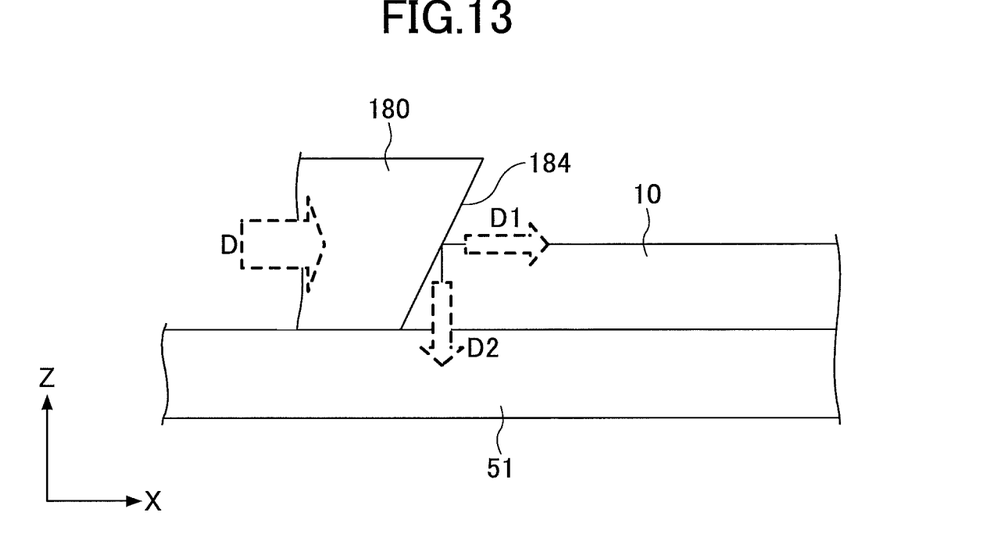
FIG. 13 is a drawing illustrating forces applied by an inner case to a printed-circuit board.

FIGS. 12A through 13 illustrate an inner case 180 of the second embodiment. In FIGS. 12A through 13, the pressing surfaces 184 inclines with respect to a bottom surface of the lower outer case 51 on which the inner case 180 is placed.

As illustrated by FIG. 13, when the inner case 180 moves toward the board 10 in an X-axis direction (arrow D), the pressing surfaces 184 press the board 10. Because the pressing surfaces 184 are inclined with respect to the lower outer case 51, the force applied by the pressing surfaces 184 to the board 10 is divided into an X-axis direction component (D1) and an Z-axis direction component (D2). The X-axis direction component acts in a direction to clamp the board 10 between the pressing surfaces 184 and the protrusions 51c as in the first embodiment. The Z-axis direction component acts in a direction to press the board 10 against the bottom surface of the lower outer case 51 and to fix the board 10 to the bottom surface of the lower outer case 51.

Figure 14A:
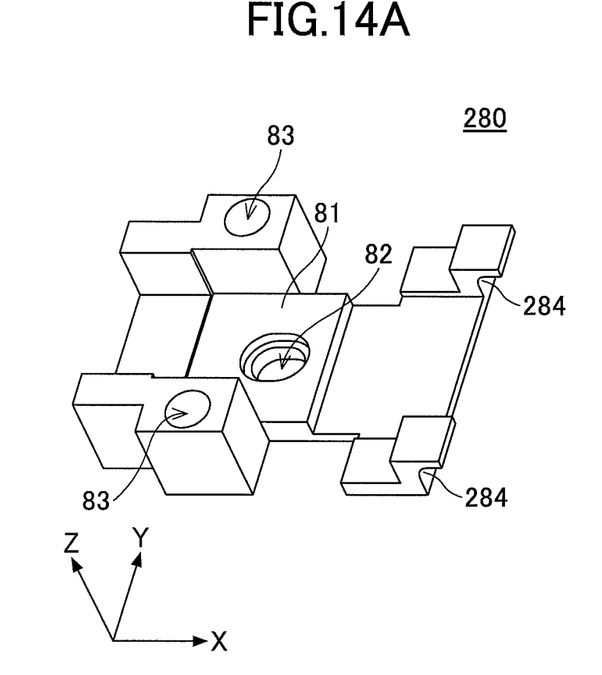
FIGS. 14A and 14B are perspective views of an inner case according to a variation of the second embodiment.
Figure 14B:
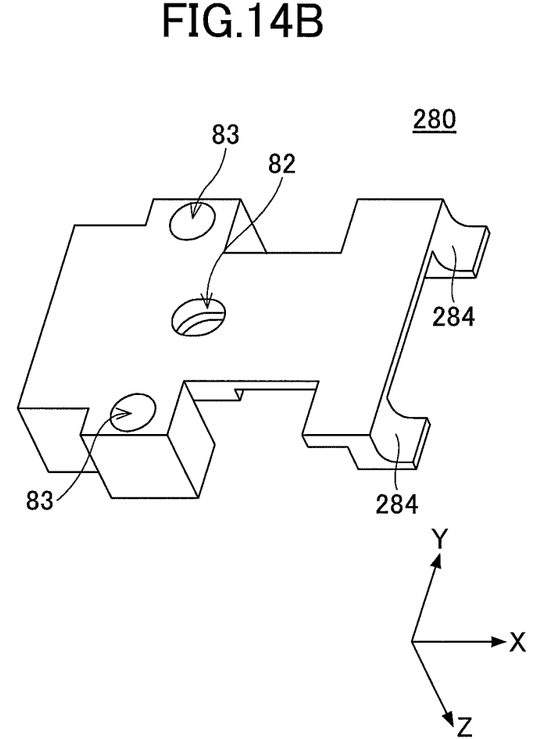
Figure 15:
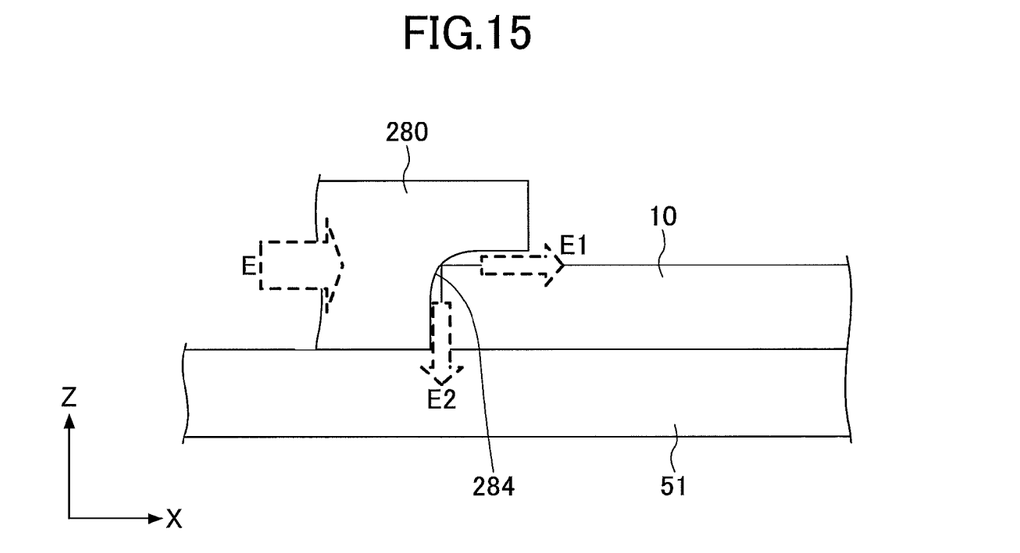
FIG. 15 is a drawing illustrating forces applied by an inner case to a printed-circuit board.

FIGS. 14A through 15 illustrate an inner case 280 including curved pressing surfaces 284.

As illustrated by FIG. 15, when the inner case 280 moves toward the board 10 in an X-axis direction (arrow E), the pressing surfaces 284 press the board 10. Because the pressing surfaces 284 are curved, the force applied by the pressing surfaces 284 to the board 10 is divided into an X-axis direction component (E1) and a Z-axis direction component (E2). The X-axis direction component acts in a direction to clamp the board 10 between the pressing surfaces 284 and the protrusions 51c. The Z-axis direction component acts in a direction to press the board 10 against the bottom surface of the lower outer case 51 and to fix the board 10 to the bottom surface of the lower outer case 51.

With the inner case 180 and the inner case 280, the board 10 can be fixed not only in the X-axis direction but also in the Z-axis direction.

Configurations of the inner cases 180 and 280 of the second embodiment not described above are substantially the same as those of the inner case 80 of the first embodiment.

Third Embodiment

Figure 16:
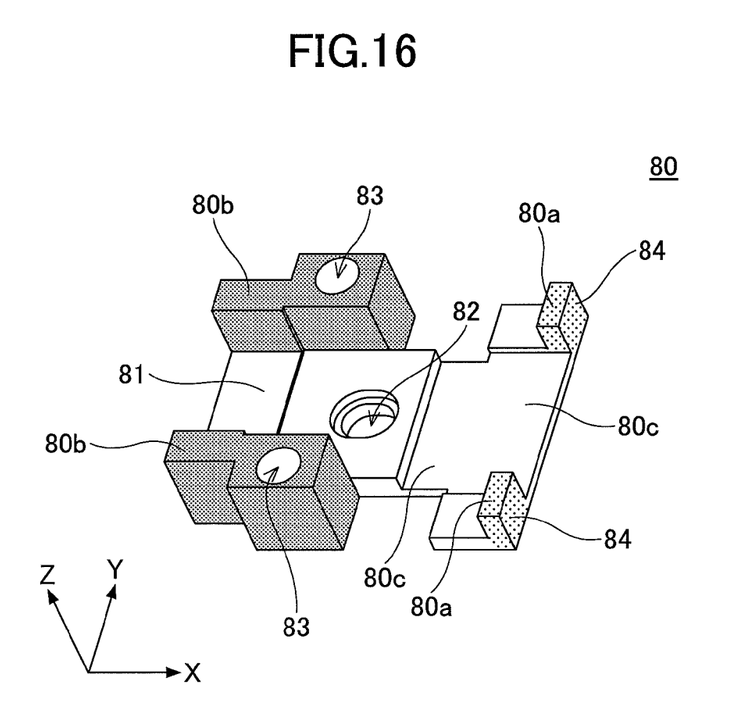
FIG. 16 is a perspective view of an inner case according to a third embodiment.

An inner case 80 of the third embodiment as illustrated by FIG. 16 is formed of a combination of different materials. The inner case 80 includes pressing parts 80a including pressing surfaces 84, screw hole forming parts 80b including screw holes 83, and a body 80c. The pressing parts 80a are for fixing the board 10, and are preferably formed of an elastic material such as rubber. The screw hole forming parts 80b are preferably formed of a rigid material such as a metal. The body 80c is preferably formed of a resin that can be relatively easily formed into a complicated shape.

The inner case 80 of the third embodiment may be produced as described below. First, the screw hole forming parts 80b are formed with a metal. Next, the body 80c is formed and combined with the screw hole forming parts 80b by insert molding. Then, the pressing parts 80a are formed with an elastomer at predetermined positions on the body 80c to complete the inner case 80.

An aspect of this disclosure provides a highly-reliable, high-yield optical module that can firmly fix a printed-circuit board to a housing at a desired position so as not to cause a waveguide to warp.

Optical modules according to embodiments of the present invention are described above. However, the present invention is not limited to the specifically disclosed embodiments, and variations and modifications may be made without departing from the scope of the present invention.

What is claimed is:

1. An optical module, comprising:
a first ferrule;
a second ferrule;

a clip for holding the first ferrule and the second ferrule together;

a board including a light-emitting element and a light-receiving element;

an optical waveguide connecting the board to the first ferrule;

an outer case forming a housing of the optical module and including a protrusion; and an inner case disposed in the outer case and to which the clip is attached, a pressing surface being formed at an end of the inner case, wherein a first end of the board is in contact with the protrusion and a second end of the board is in contact with the pressing surface such that the board is clamped between the protrusion and the pressing surface.

2. The optical module as claimed in claim 1, wherein the pressing surface is an inclined surface or a curved surface.

3. The optical module as claimed in claim 1, wherein a position where the inner case is attached to the outer case is adjustable.

4. The optical module as claimed in claim 1, wherein a position where the clip is attached to the inner case is adjustable.

5. An optical module, comprising:

a first ferrule;

a second ferrule;

a clip for holding the first ferrule and the second ferrule together;

a board including a light-emitting element and a light-receiving element;

an optical waveguide connecting the board to the first ferrule;

an outer case forming a housing of the optical module; and an inner case disposed in the outer case and to which the clip is attached, a pressing surface being formed at an end of the inner case, wherein the board is in contact with the outer case and an end of the board is in contact with the pressing surface such that the board is clamped between the outer case and the pressing surface.

* * * * *